May 11, 1965  H. LAMM  3,182,641
ROTARY PISTON ENGINE
Filed Jan. 26, 1962
FIG. 1
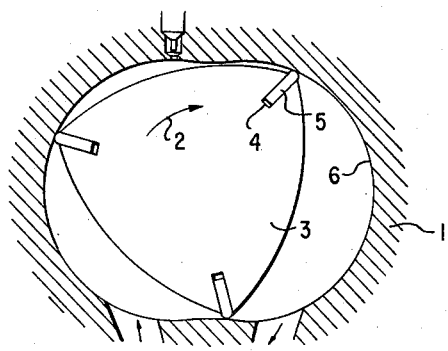
FIG. 2  FIG. 3  FIG. 4  FIG. 5
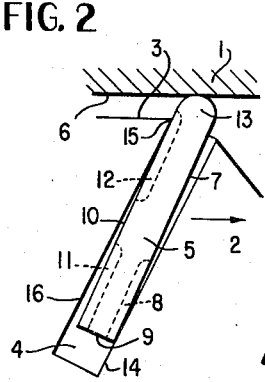 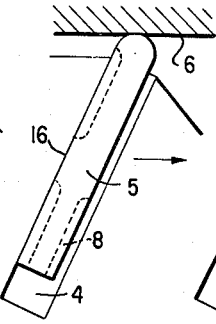 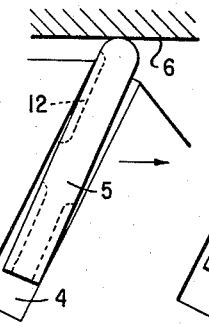 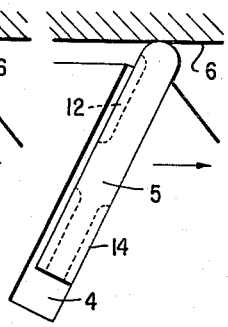
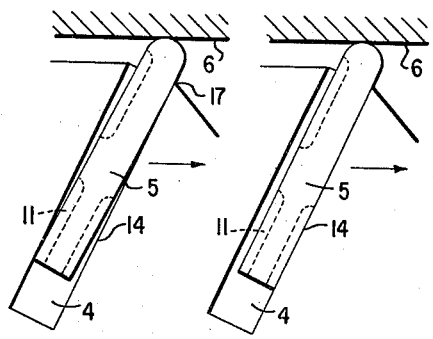
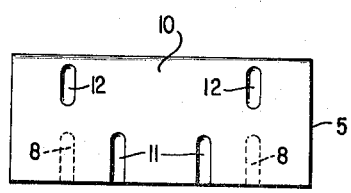
FIG. 8
FIG. 6  FIG. 7
INVENTOR.
HEINZ LAMM
BY  *Dicke and Craig*
ATTORNEYS.

3,182,641
ROTARY PISTON ENGINE
Heinz Lamm, Stuttgart-Bad, Cannstatt, Germany, assignor to Daimler-Benz Aktiengesellschaft, Stuttgart-Unterturkheim, Germany
Filed Jan. 26, 1962, Ser. No. 169,028
Claims priority, application Germany, Feb. 1, 1961, D 35,305
7 Claims. (Cl. 123—8)

The present invention relates to the construction of sealing strips or ledge members which are arranged movably in the radial direction thereof within grooves disposed parallelly to the axis within the piston of a rotary-piston engine, especially within pistons of rotary-piston internal combustion engines and which slide with the outer end faces thereof along the cam track of the piston within the housing of the engine.

Particularly with rotary-piston internal combustion engines it has been noted that the sealing strips or ledge members which are arranged within grooves disposed parallelly to the axis thereof, tend under the influence of several factors to tilt or cant so as to assume inclined positions within the grooves in which the sealing strips or ledge members abut on one side with the side surfaces thereof against the boundary edges of the groove and on the other side with the lower edges thereof against the walls of the groove. As a result thereof, it is not possible for the gas forces which contribute considerably with small inertia forces to push the sealing strips or ledge members out of the grooves into sealing engagement against the cam track or curved path of the piston, to become effective along the side or face of the sealing strip or ledge member facing the groove bottom because the gases cannot reach the groove bottom along a path between the side surfaces of the sealing strips or ledge members and flanks of the grooves. The sealing strips or ledge members then get stuck within the grooves and only when the occurring inertia forces become larger than the friction of the sealing ledge members within the grooves thereof, there takes place a sudden impingement of the sealing ledge members against the cam track. As a result of the resilient impingement the sealing strips or ledge members are again thrown back in the radially inward direction. This operation repeats itself several times in succession. Places of wear are formed thereby at the cam track, namely so-called chatter marks. Additionally, the sealing strips or ledge members are worn out in a relatively short time. The sealing strips or members then do not provide any longer a satisfactory seal and output losses occur in the engine.

The noted shortcomings mentioned hereinabove are eliminated by the present invention with simple means.

The present invention essentially consists in arranging at least on the front side of the sealing strips or ledge members grooves, channels or the like which extend substantially in the radial direction, which begin at the end face of the sealing strips or ledge members facing the groove bottom and which terminate in the side wall of the ledge members within the area of the groove walls. There is achieved by such an arrangement in the most commonly recurring cases when the sealing ledge member abuts with the lower edge thereof at the leading face thereof against the upper edge of the groove that the gases disposed in the space ahead of the sealing ledge member may reach through the grooves, channels or the like below the sealing ledge member and are able thereby to push or force the sealing ledge member in the outward direction. The tilting of the sealing ledge member caused by the friction along the cam track is effectively removed as a result thereof and the sealing ledge member abuts smoothly against the oppositely disposed groove flank.

According to a further feature of the present invention, the grooves, channels or the like extending substantially in the radial direction may also be arranged on the rear side of the sealing ledge members which grooves, channels or the like begin at the outer end face or directly below the same and terminate in the sidewall ahead of the end face of the sealing ledge members facing the groove bottom. This arrangement assures that with a sealing ledge member tilted in the groove, the trailing end of which abuts against the upper boundary of the groove, gas of higher pressure disposed on the trailing side of the ledge member may reach through the grooves, channels or the like, the groove bottom in order to stabilize the sealing ledge member so that it abuts against a groove flank and is pushed in the outward direction.

The length of the grooves, channels or the like may amount to approximately a quarter to approximately one-half the height of the sealing ledge member so that any short-circuiting or by-pass connection from one side of the sealing ledge member to the other side thereof is completely eliminated.

The grooves, channels or the like on one side of the sealing ledge members may be arranged offset from those on the other side thereof.

Accordingly, it is an object of the present invention to provide a sealing arrangement for rotary piston internal combustion engines provided with sealing ledge members disposed within grooves of the piston extending parallelly to the axis thereof, which eliminates, by simple and inexpensive means, the shortcomings and disadvantages encountered in the prior art arrangements.

It is another object of the present invention to provide an internal combustion engine, especially a rotary piston internal combustion engine of trochoidal construction provided with sealing strips disposed in grooves parallel to the axis of the engine housing or driven shaft in which premature wear of the internal cam tracks provided at the housing for the sealing members is effectively avoided.

Still another object of the present invention resides in the provision of a sealing arrangement consisting of sealing members disposed in grooves arranged in pistons of rotary-piston internal combustion engines which effectively prevents tilting and jamming of the sealing members within the piston grooves thereof.

A further object of the present invention resides in the provision of an arrangement of the sealing members in rotary-piston internal combustion engines which assures constant abutment, at all times, of the sealing members against the internal cam track provided within the housing of the engine.

Still a further object of the present invention resides in the provision of a sealing arrangement for a rotary piston internal combustion engine, particularly of trochoidal construction in which sealing losses as well as output losses are effectively minimized that might occur as a result of improper functioning of the seals constituted by radially slidable sealing members.

These and other objects, features and advantages of the present invention will become more obvious from the following description when taken in connection with the accompanying drawing which shows, for purposes of illustration only, one embodiment in accordance with the present invention, and wherein FIGURE 1 is a schematic cross sectional view through a rotary piston internal combustion engine of known construction provided with sealing ledge members disposed parallelly to the axis at the corners of the piston.

FIGURES 2 through 7 are partial schematic views, on an enlarged scale, of the sealing ledge members according to the present invention in different positions thereof within the grooves, and FIGURE 8 is an elevational end view of a sealing member in accordance with the present invention.

Referring now to the drawing wherein like reference numerals are used throughout the various views to designate corresponding parts, and more particularly to FIGURE 1, the rotary piston internal combustion engine shown therein consists essentially of the housing 1 and of the piston 3 rotating within the housing 1 in the direction of arrow 2. The piston 3 is provided at the corners thereof with sealing ledge members 5 adapted to move in the radial direction within grooves 4 disposed parallelly to the axis thereof. The sealing members 5 slide with the end faces thereof along the cam track or curved path 6 of the housing 1.

In order to render harmless the tilting or canting of the sealing ledge members 5 within the grooves 4 as would occur during operation of the engine, the sealing ledge members 5 according to the present invention are provided, as more clearly shown in FIGURES 2 through 8, along the side surfaces thereof with grooves which make it possible to the gas forces to push the sealing ledge members safely and securely against the cam track and possibly to erect or straighten the same within the respective grooves thereof in case of tilting or canting.

The sealing ledge members 5 are provided at the leading side 7 thereof as viewed in the direction of rotation of the piston 3 indicated by the arrow 2 with two grooves 8 arranged in the radial direction which commence at the end surfaces 9 of the sealing ledge members facing the groove 4 and which terminate in the side wall with an overall length of one-quarter the height of the sealing ledge members. The sealing ledge members 5 are also provided at the trailing sides 10 thereof as viewed in the direction of rotation of the piston indicated by arrow 2, with two grooves 11 which commence at the surfaces 9 and terminate in the side walls thereof. The length of the grooves 11 corresponds to the length of the grooves 8. As shown in FIGURE 8, the grooves 8 and 11 are displaced or offset in the longitudinal direction of the sealing ledge member 5.

In addition to the grooves 11, grooves 12 are also present at the rear or trailing side 10 of the sealing ledge members 5 which grooves 12 commence closely below the outer end face 13 of the sealing ledge members and also extend in a radial direction thereof. The length of the grooves 12 corresponds approximately to the length of the grooves 8 or 11.

In the position of the sealing ledge member 5 illustrated in FIGURE 2, it is assumed that the end face 13 of the sealing ledge member 5 is braked by friction at the cam track 6 of the housing 1. The sealing ledge member 5 thereby tilts within the groove 4 thereof as illustrated in this figure and abuts along the front or leading side 7 with the lower edge thereof against the flank 14 of the groove 4 whereas the rear side 10 abuts against the upper edge 15 of the groove 4. Gas under pressure from the space in front of the sealing ledge member 5 may reach through the grooves 8 below the sealing ledge member 5 whereby the sealing ledge member 5 is pressed outwardly and more particularly, as shown in FIGURE 3, against the flank 16 of the groove 4. A connection between the spaces in front of and behind the sealing ledge member 5 however, is not present.

According to FIGURE 4, the sealing ledge member 5 assumes the same position as in FIGURE 2. However, it is assumed that in this case, higher pressures prevail within the space behind the sealing ledge member 5 than in the space in front thereof. By reason of the presence of grooves 12, the pressure gases may reach the bottom of the groove 4 and thereby stabilize the sealing ledge member 5. The sealing ledge member 5 thereby abuts against the flank 14 of the groove 4 and assumes the position thereof shown in FIGURE 5 in which the spaces in front and behind the sealing ledge member are again completely separated from each other.

If it is assumed that in the position of the sealing ledge member 5 as shown in FIGURE 6 the sealing ledge member 5 is tilted as a result of the higher pressure behind the sealing ledge member and abuts with the leading edge 7 thereof against the upper edge 17 of the flank 14 of the groove 4, then pressure gases from the space disposed behind the sealing ledge member 5 can reach the bottom of the groove 4 below the sealing ledge member 5 as a result of the presence of grooves 11. The sealing ledge member 5 thereby abuts against the flank 14 of the groove 4 and presses the sealing ledge member 5 against the cam track 6 as shown in FIGURE 7.

Short-circuiting connections between the space in front and behind the sealing ledge member can not occur as a result of the arrangement of the grooves 8, 11 and 12 when the sealing ledge member abuts against a groove flank in the manner described hereinabove. Additionally, springy means of any conventional construction may be arranged below the sealing ledge member in the bottom of the groove 4 which seek to force or press the sealing ledge members against the cam track 6 and reach mainly their full effectiveness if the gas and inertia forces are not yet sufficiently large, for example, during starting of the engine. Possibly also springy means may be arranged along the sides of the sealing ledge member in order to stabilize the sealing ledge member during small gas and inertia forces.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. A construction of the sealing members which are movable substantially in the radial direction within grooves disposed substantially parallelly to the axis within pistons of rotary engines, especially within pistons of rotary piston internal combustion engines and which slide with the outer end surfaces thereof against the cam track of the piston provided within the housing of the engine, the improvement essentially consisting of first channel means arranged at the front side of a sealing member and extending substantially in the radial direction, said first channel means commencing at the end surface of a respective sealing member facing the groove bottom and terminating in the side wall thereof within the area of the groove walls, and second channel means arranged at the rear side of the sealing member and extending substantially in the radial direction, said second channel means commencing at least directly below the radially outer end face of a respective sealing member and terminating in the side wall of said sealing member at a point radially outward of the said end surface thereof facing said groove bottom, and said channel means being of a length approximately one-quarter to one-half the height of a respective sealing member and being in the form of a plurality of channels spaced with respect to each other and of relatively small dimension in a direction parallel to said axis.

2. A construction of the sealing members which are movable substantially in the radial direction within grooves disposed substantially parallelly to the axis within pistons of rotary engines, especially within pistons of rotary piston internal combustion engines and which slide with the outer end surfaces thereof against the cam track of the piston provided within the housing of the engine, the improvement essentially consisting of first channel means arranged at the front side of a sealing member and extending substantially in the radial direction, said first channel means commencing at the end surface of a respective sealing member facing the groove bottom and terminating in the side wall thereof within the area of the groove walls, and second channel means arranged at the rear side of the sealing member and extending substantially in the radial direction, said second channel means commencing at least directly below the radially outer end face of a respective sealing member and terminating in the side wall of said sealing member at a point radially outward of the said end surface thereof facing said groove bottom, the first channel means being disposed on one side of said sealing member offset in the direction of said axis with respect to the second channel means on the other side thereof, and said channel means being of a length approximately one-quarter to one-half the height of a respective sealing member and being in the form of a plurality of channels spaced from one another and of relatively small dimension in a direction parallel to said axis.

3. A construction for sealing means which are movable substantially in the radial direction within groove means disposed substantially parallelly to the axis piston means of rotary engines, and which slide with the outer end surfaces thereof against the internal cam surface means provided within the housing of the engine, comprising sealing means movably accommodated in said groove means and provided with channel means arranged on the front and rear side of the sealing means and each extending substantially in the radial direction, said channel means commencing substantially at the surface of the sealing means facing the bottom of said groove means and terminating in the side wall of said groove means within the area of the groove walls, and further channel means on one of said sides of said sealing means commencing at least directly below the radially outer end face of said sealing means and terminating in the said one side thereof at a point radially outward of said surface facing the bottom of said groove means, all of said channel means having a length of approximately one quarter to one half the height of the sealing means and being in the form of a plurality of grooves spaced from one another and of relatively small dimension in a direction parallel to the axis of the piston means.

4. A rotary-piston internal combustion engine, comprising
an engine housing provided with internal curved surface means,
polygonal rotary-piston means within said housing adapted to rotate about an axis and provided with groove means disposed at the piston corners substantially parallelly to said axis,
and a sealing arrangement for sealing the piston means with respect to said curved surface means including a plurality of sealing members slidingly arranged within said groove means and gliding with the radially outer end surfaces thereof against said curved surface means, said sealing members being provided, along the one side thereof which extends parallelly to said axis, with first channel means extending from the bottom surface facing the groove bottom of a respective sealing member substantially in the radial direction, and on the opposite side thereof, with second channel means also extending from said bottom surface in the radial direction and with third channel means extending from the area of the radially outer end surfaces radially inward, said channel means being of a length approximately ¼ to ½ the radial dimension of a respective sealing member and being in the form of a plurality of channels spaced from each other and of relatively small dimension in a direction parallel to the axis of said piston means.

5. A rotary-piston internal combustion engine, comprising
an engine housing provided with internal curved surface means,
polygonal rotary-piston means within said housing adapted to rotate about an axis and provided with groove means disposed at the piston corners substantially parallelly to said axis,
and a sealing arrangement for sealing the piston means with respect to said curved surface means including a plurality of sealing members slidingly arranged within said groove means and gliding with the radially outer end surfaces thereof against said curved surface means, said sealing member being provided, along the one side thereof which extends parallelly to said axis, with first channel means extending from the bottom surface facing the groove bottom of a respective sealing member substantially in the radial direction, and on the opposite side thereof, with second channel means also extending from said bottom surface in the radial direction and with third channel means extending from the area of the radially outer end surfaces radially inward, said channel means being of a length approximately ¼ to ½ the radial dimension of a respective sealing member and being in the form of a plurality of channels spaced from each other and of relatively small dimension in a direction parallel to the axis of said piston means,
and said first and second channel means being offset with respect to each other in said last-mentioned direction.

6. A rotary-piston internal combustion engine comprising
an engine housing provided with internal curved surface means,
polygonal rotary-piston means within said housing adapted to rotate about an axis and provided with groove means disposed at the piston corners substantially parallelly to said axis,
and a sealing arrangement for sealing the piston means with respect to said curved surface means including a plurality of sealing members slidingly arranged within said groove means and gliding with the radially outer end surfaces thereof against said curved surface means, said sealing members being provided, along the one side thereof which extends parallelly to said axis and normally faces the direction of rotation with first channel means extending from the bottom surface facing the groove bottom of a respective sealing member substantially in the radial direction, and on the opposite side thereof, with second channel means also extending from said bottom surface in the radial direction and with third channel means extending from the area of the radially outer end surfaces radially inward, said channel means being of a length approximately ¼ to ½ the radial dimension of a respective sealing member and being in the form of a plurality of channels spaced from each other and of relatively small dimension in a direction parallel to the axis of said piston means,
and said first and second channel means being offset with respect to each other in said last-mentioned direction.

7. A rotary-piston internal combustion engine, comprising
an engine housing provided with internal curved surface means,
polygonal rotary-piston means within said housing adapted to rotate about an axis and provided with groove means disposed at the piston corners substantially parallelly to said axis,
and a sealing arrangement for sealing the piston means with respect to said curved surface means including a plurality of sealing members slidingly arranged within said groove means and gliding with the radially outer end surfaces thereof against said curved surface means, said sealing members being provided, along the one side thereof which extends parallelly to said axis and normally faces the direction of rotation, with first channel means extending from the bottom surface facing the groove bottom of a respective sealing member substantially in the radial direction, and on the opposite side thereof, with second channel means also extending from said bottom surface in the radial direction and with third channel means extending from the area of the radially outer end surfaces radially inward, said channel means being of a length approximately ¼ to ½ the radial dimension of a respective sealing member and being in the form of a plurality of channels spaced from each other and of relatively small dimension in a direction parallel to the axis of said piston means.

References Cited by the Examiner

UNITED STATES PATENTS

| | | | |
|---|---|---|---|
| 2,371,081 | 3/45 | Tucker | 103—136 |
| 2,423,639 | 7/47 | Czarnecki | 103—135 |
| 2,435,279 | 2/48 | Hubacker | 103—136 |
| 2,612,114 | 9/52 | Ernst | 103—135 |
| 2,612,115 | 9/52 | Ernst | 103—135 |

FOREIGN PATENTS 590,085 6/25 France.

JOSEPH H. BRANSON, JR., *Primary Examiner.*